(12) United States Patent
Huang

(10) Patent No.: US 7,450,343 B2
(45) Date of Patent: Nov. 11, 2008

(54) DEVICE, APPARATUS AND METHOD FOR REMOVING PARTICULATE CONTAMINATION FROM THE TRAILING EDGE OF A HARD DISK DRIVE AIR BEARING

(75) Inventor: Weidong Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 559 days.

(21) Appl. No.: 11/116,858

(22) Filed: Apr. 28, 2005

(65) Prior Publication Data

US 2006/0245111 A1    Nov. 2, 2006

(51) Int. Cl.
G11B 17/32    (2006.01)

(52) U.S. Cl. .................................................. 360/235.7

(58) Field of Classification Search ... 360/235.1–235.7, 360/235, 236.2, 235.8, 236.3
See application file for complete search history.

(56) References Cited

U.S. PATENT DOCUMENTS

| | | | |
|---|---|---|---|
| 3,609,721 A * | 9/1971 | Meneley | 360/78.04 |
| 4,212,044 A | 7/1980 | Plotto | |
| 5,490,025 A | 2/1996 | Dorius et al. | |
| 5,751,517 A | 5/1998 | Agarwal | |
| 5,940,249 A | 8/1999 | Hendriks | |
| 6,021,020 A * | 2/2000 | Itoh et al. | 360/236.1 |
| 6,055,127 A | 4/2000 | Boutaghou | |
| 6,072,663 A * | 6/2000 | Yokohata et al. | 360/235.8 |
| 6,144,528 A * | 11/2000 | Anaya-Dufresne et al. | 360/235.4 |
| 6,229,671 B1 | 5/2001 | Boutaghou et al. | |
| 6,490,134 B2 | 12/2002 | Boutaghou | |
| 6,498,701 B1 | 12/2002 | Berg | |
| 6,535,354 B1 | 3/2003 | Mitoh | |
| 6,560,071 B2 * | 5/2003 | Chapin et al. | 360/235.7 |
| 6,594,113 B2 * | 7/2003 | Rao et al. | 360/235.8 |
| 6,661,612 B1 | 12/2003 | Peng | |
| 6,710,976 B2 * | 3/2004 | Chapin et al. | 360/235.8 |
| 6,956,719 B2 * | 10/2005 | Mundt et al. | 360/236.3 |
| 2002/0008938 A1 | 1/2002 | Nath et al. | |
| 2004/0095680 A1 | 5/2004 | Takahashi | |

FOREIGN PATENT DOCUMENTS

JP    53-72929 U    6/1978

* cited by examiner

*Primary Examiner*—Allen T Cao (57) ABSTRACT

A method, apparatus, and assembly for removing a contaminant from an air bearing of a hard disk drive head disk assembly is described. The method and apparatus provide a foil directing an air flow within the head disk assembly about a pad of the air bearing; re-directing the air flow towards a trailing edge of the pad so that the airflow impinges the trailing edge, thus dislodging and removing contaminants from the trailing edge of the pad.

20 Claims, 5 Drawing Sheets

DEVICE, APPARATUS AND METHOD FOR REMOVING PARTICULATE CONTAMINATION FROM THE TRAILING EDGE OF A HARD DISK DRIVE AIR BEARING

TECHNICAL FIELD

The present invention relates to the field of hard disk drives. More specifically, embodiments of the present invention relate to deterring and removing fouling by particulate contaminates in disk drives with sensing heads in close proximity to a moving media surface.

BACKGROUND

Hard disk drives are used in many computer system operations. In fact, many computing systems operate with some type of hard disk drive to store the most basic computing information, e.g., the boot operation, the operating system, the applications, etc. In general, the hard disk drive is a device, which may or may not be removable, but without which, some computing systems may not operate.

One basic hard disk drive model was developed approximately 40 years ago and in some ways resembles a phonograph type apparatus. For instance, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). The assembly consisting of the disks, HGAs, spindle, housing, and the other parts internal to the housing is called the Head Disk Assembly, or HDA.

In operation, the hard disk is rotated at a set speed via a spindle motor assembly having a central drive hub. Additionally, there are channels or tracks spaced at known intervals across the disk. Most current embodiments arrange the signal regions in concentric circular tracks, but other designs, such as spirals or irregular closed or open paths are possible and useful. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk. Refinement of the disk and the head have provided reductions in the size of the hard disk drive. For example, the original hard disk drive had a disk diameter of 24 inches. Modern hard disk drives are much smaller and include disk diameters of less than 2.5 inches. Small disk drive type apparatus such as micro drives can be smaller still. Refinements also include the use of smaller components and laser and other optical related components within the head portion. Reducing the read/write tolerances of the head portion allows the tracks on the disk to be reduced in size by a corresponding margin. Thus, as modern laser and other electro-optical and other micro recognition technologies are applied to the head, the track size on the disk can be further compressed.

The ever increasing need for data storage has led some disc drive makers to steadily increase the amount of data stored on a drive. Mechanical considerations, radiated audible noise limits, power requirements, and other factors limit the number of discs that can be economically combined in a single drive. Thus, disc drive technology has generally focused on increasing the amount of data stored on each disc surface.

Typically, tracks are arranged concentrically about a disk's surface or in an analogous arrangement. One method of increasing the amount of data a disk can store is to make each data track narrower, which allows the tracks to be spaced more closely together. This allows a larger number of tracks on each disk surface. But, as tracks become narrower, signals generated in the head caused by media alterations (e.g., from data written to the disk's magnetic, optical, thermal, and/or other media) become more difficult to detect. Thus, the signal to noise ratio can worsen, particularly in the presence of electronic and media-induced signal degradation and noise. One method to improve the signal to noise ratio, and hence the detection of media alteration (e.g., "writing"), is to position the heads more closely to the media surface. This causes the media alteration-sensing components of the head to be physically closer to the media alterations, thus improving the head sensor's ability to detect the media alterations comprising the written signal. However, care must be taken to avoid unintended contact between the head components and the moving media surface.

Typically, the heads are lightly spring loaded, with the spring tension perpendicular to the media surface plane and directed against the media surface. An air bearing separates the head and media surfaces as follows: As the media moves relative to the head, air is dragged by the disc surface through specifically designed channels in the surface of the head adjacent to the media surface. The surface of the head and the channels contained therein, collectively referred to as the air-bearing surface (ABS), are designed to generate a regions of increased air pressure in between the ABS and media surface that forces the head away from direct contact with the media surface, in effect causing the head to fly above the media surface. The separation of the head ABS and media surface, commonly called fly height, is a complex phenomenon primarily a function of air density, the spring preload, the relative speed between the head and media surface, and the pattern of channels present on the head air bearing surface adjacent to the media surface.

It is well known to those familiar with head-disk interface design that a particular head-disk combination will not fly precisely at the desired separation. Variances in mechanical tolerances, spring tensions, and other factors result in a nearly normal statistical fly-height population distribution generally centered about the mean fly height. Furthermore, the head and its mounting gimbal are subject to mechanical tolerances, aerodynamic forces, and inertial forces that can cause it to deviate from the desired attitude with respect to the media surface, e.g. static and dynamic pitch and roll). This can move some areas of the air bearing surface closer or further from the media surface.

Reducing the fly-height, while increasing the signal-to-noise ratio of the recovered signal, can lead to reduced disc drive reliability. Such reliability reduction can occur in the presence of particulate contamination. Particulate contamination can include wear particles from drive components and/or airborne contaminates from the ambient surroundings. Such particulate contaminants can accumulate on the air bearing surface.

This buildup of contaminants can disrupt air flow, thus causing the head to fly higher or lower than desired, or at a different orientation relative to the media surface than desired. This results in an increase in the width of the head design's fly height distribution, as indicated by a higher fly height population standard deviation, referred to as "sigma". A higher fly height sigma necessitates a higher targeted average fly height, to ensure an acceptable portion of head population will operate at greater than the minimum allowed fly height. Higher average fly height can cause reduced average transducer performance (e.g., signal to noise ratio) and/or lower areal densities.

The particulate buildup can also bridge the narrow fly height gap. This can lead to fouling and contact between the head and media. The resulting friction can generate more particles, which can further exacerbate contamination. This can lead to drive failure. Drive failure can occur rapidly by this mode.

The particulate buildup may also collect near the transducer elements. Much of the drive wear products have significant ferromagnetic properties. Thus, the magnetic sensitivity of a drive read element can be distorted and reduced, which can lead to lowered signal to noise ratios and drive failure. In an optical drive, contaminants can distort and/or occlude the optical path, which can result in poor performance.

SUMMARY

Accordingly, what is needed is an air bearing design that will continue to function reliably at ultra-low fly heights, even in the unavoidable presence of particulate contamination.

A method, apparatus, and assembly for removing a contaminant from an air bearing of a hard disk drive head disk assembly. The method and apparatus provide a foil directing an air flow within the head disk assembly about a pad of the air bearing; re-directing the air flow towards a trailing edge of the pad, impinging the trailing edge, and dislodging and removing contaminant from the trailing edge of the pad with the impinging air flow.

A method, apparatus, and assembly for removing particulate contamination from the trailing edge of a hard disk drive air bearing are disclosed.

BRIEF DESCRIPTION OF THE DRAWINGS

The accompanying drawings, which are incorporated in and form a part of this specification, illustrate embodiments of the invention and, together with the description, serve to explain the principles of the invention. These drawings depict exemplary embodiments and are not meant to limit the present invention. For instance, FIG. 1 is not to be interpreted as limiting the invention to magnetic disk drives. The drawings are not to scale.

DETAILED DESCRIPTION

A method, apparatus, and assembly for removing particulate contamination from the trailing edge of a hard disk drive air bearing are described herein. Reference is now made in detail to exemplary embodiments of the invention, examples of which are illustrated in the accompanying drawing figures. While the invention is described herein in conjunction with these exemplary embodiments, this description is not intended to limit the invention to these embodiments. On the contrary, the invention is intended to cover alternatives, modifications and equivalents, which may be included within the spirit and scope of the invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus, etc. have not been described in detail so as not to unnecessarily obscure aspects of the present invention.

Embodiments of the present invention provide a computer disk drive air bearing surface, integrally formed foil, and method for removing particulate contamination from the trailing edge of the air bearing features. One embodiment provides a center bearing pad with optimum dimensions and one or more foils directing air flow towards the trailing edge of the center pad.

Therefore, embodiments of the present invention allow the ABS to be effectively positioned in reference to the disk surface without particulate contaminate buildup proximate with the trailing edge of said ABS features. Fouling, head-disk contact, reduced transducer signal-to-noise ratio, and other detrimental outcomes of particulate contaminate buildup are deterred with one or more foils according to embodiments of the present invention.

Figure 1:
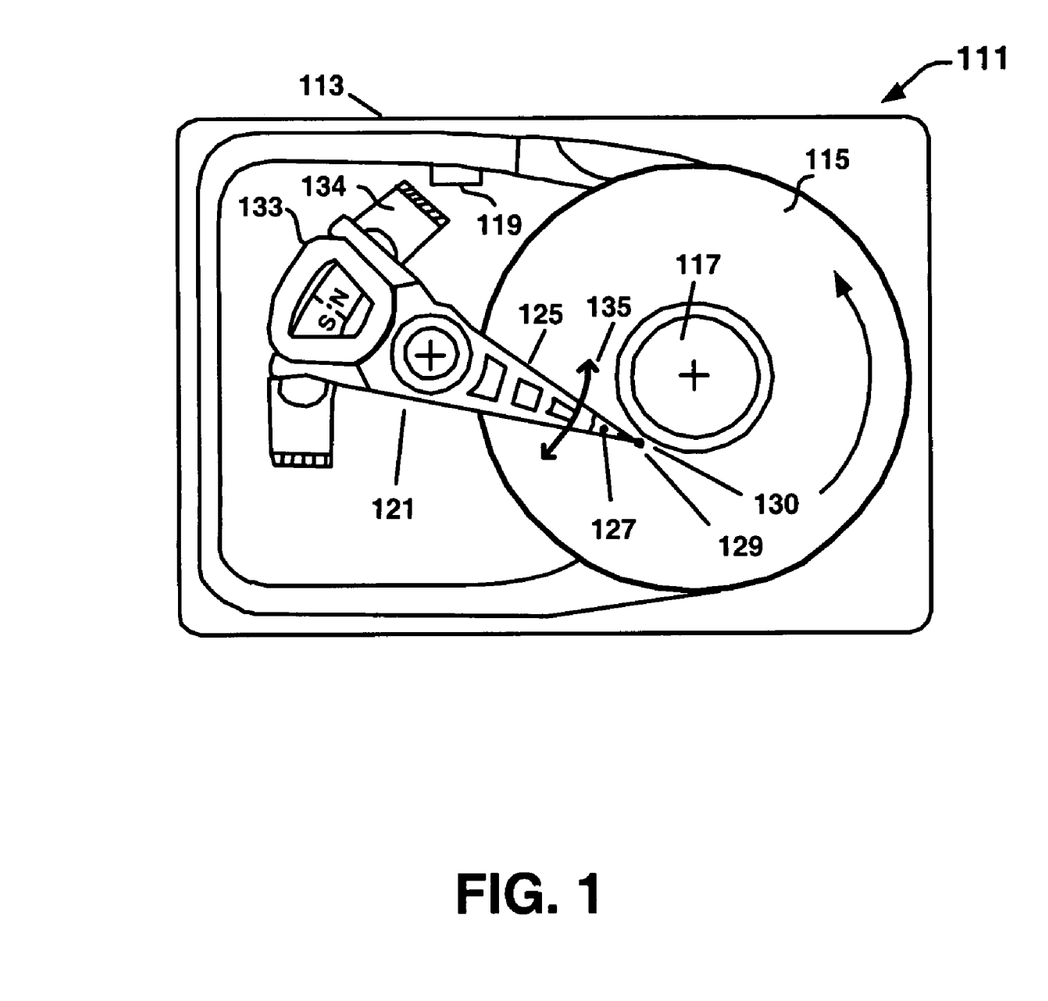
FIG. 1 depicts a hard disk drive in accordance with one embodiment of the present invention.

FIG. 1 depicts a hard disk drive or "file" 111 for storing data, in accordance with one embodiment of the present invention. While depicted and discussed with reference to exemplary magnetic media, file 111 can comprise optical or other media. File 111 has an outer housing or base 113 containing a disk pack having at least one disk 115, an actuator 121, several actuator arms 125, one of which is shown. Disk 115 comprises magnetic, optical, or other media. In one embodiment, actuator arms 125 are arrayed parallel to one another, e.g., in the form of a comb that is movably or pivotally mounted to base 113 about a pivot assembly 123. A controller 119 is also mounted to base 113 for selectively moving the comb of arms 125 relative to disk 115. The disk 115 is rotated by a spindle motor assembly having a central drive hub 117.

In the embodiment shown, each arm 125 has extending from it at least one cantilevered load beam and integrated lead suspension (ILS) 127. A read/write head slider 129 is mounted on the obverse of ILS 127 and secured to each ILS 127, e.g., on the obverse side of that depicted. The head slider has an air bearing surface 130 on the surface proximate and generally parallel to the disk surface (e.g., on the obverse of the side depicted). The level of integration called the head gimbal assembly is the head slider 129, which are mounted on suspension 127. In one embodiment, the slider 129 is bonded to the end of ILS 127.

In one embodiment, ILS 127 has a spring-like quality, which biases or presses the air-bearing surface 130 against the disk 115 to cause the slider 129 to fly at a precise distance from the disk. ILS 127 has a hinge area that flexes, pivots, etc., to provide for the spring-like quality. A coil 133 is free to move within a magnet assembly 134, the top pole of which is not shown in this perspective. Coil 133 is mounted to arms 125 opposite the ILS 127. In one embodiment, coil 133 comprises a component similar to those referred to in the art as "voice coils." Movement 135 of the actuator 121 (depicted by an arrow) by controller 119 causes the head 129 to move along radial arcs across tracks on the disk 115 until the heads 129 settle on their set target tracks. In one embodiment, the heads 129 operate in a manner similar to that of others known in the art. In one such embodiment, the ILS 127 move in unison with one another. In another embodiment, file 111 uses multiple independent actuators, similar to those shown. In that alternate embodiment, the arms 125 are free to move independently of one another.

Figure 2:
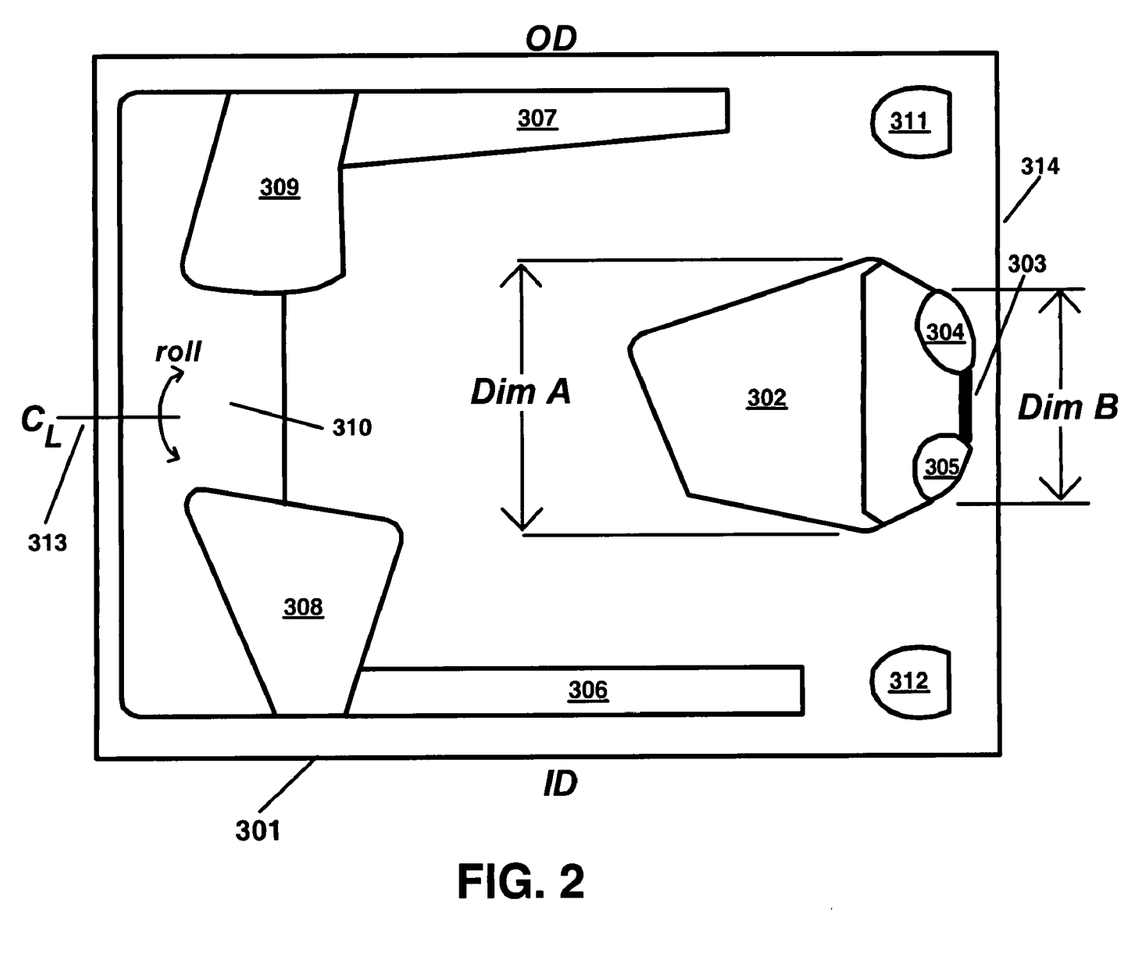
FIG. 2 depicts a disk drive head ABS.

FIG. 2 depicts the air bearing surface 130 of slider 129 of file 111 of FIG. 1. Slider body 301 upon which are disposed features and transducer elements as described as follows. In one embodiment, such features and elements are deposited and/or etched, etc., with techniques well known in the art. The leading edge 313 of slider 130 is proximate with air dam 310. The trailing edge 314 of slider 130 is proximate with pads 311 and 312, transducer 303, and pad area 304 and 305.

Front air dam 310, rails 306 and 307, and air bearing structures 308, 309, 311, 312, and 302 establish an air pressure distribution formed by aerodynamic effects on air dragged, pulled, etc. under the slider 301 by relative motion between slider and media surface and related effects. Center pad 302 also carries the transducer elements, collectively denoted with element number 303. The composition and/or layers comprising the transducer 303 in various embodiments can depend upon a particular intended application. However in one embodiment, the dimension of transducer 303 is independent of other slider features. Embodiments of the present invention are well suited to transducer 303 having a variety of characteristics. The ratio of Dimension A to Dimension B is significant to the performance of slider 301. In one embodiment, the magnitude of the ratio of dimensions A and B affects "flying" characteristics of slider 301 such as take-off velocity. Among various embodiments, higher dimension A/B ratios tend to improve these flying characteristics. For instance, between embodiments with all other relevant attributes alike, the take-off velocity is beneficially lower in that which has the higher dimension A/B ratio.

The attitude, e.g. the angle of attack, roll, pitch, and/or position of the slider 301 is slanted with respect to the media surface (denoted in FIG. 1, item 115), with leading edge 313 and trailing edge 314 essentially parallel to the disk surface. Thus, the leading edge 313 of slider 301 is located further from the disk surface than trailing edge 314. The resulting tilting attitude locates areas 304 and 305 of the center pad 302, and transducer 303 as the features that are closest to the disk surface which the head is flying over. It can be advantageous to position transducer 303 at the lowest flying region.

For some air bearing sliders, situations or conditions can arise wherein the length Dimension B multiplies the roll component of the slider attitude. As the slider rolls, regions located laterally some distance from the roll axis can move further or closer to the proximate disk surface, approximately by the distance given by the region's distance from the roll axis multiplied by the sine of the roll magnitude. This can result in areas 304 and 305 of the center pad 302 being positioned closer to the disk surface during roll, which decreases the head-disk separation. The fly height reduction due to this rolling increases the standard deviation of the head design's fly height population distribution. The expected range of roll attitudes, both static and dynamic, is known. Thus, the slider is designed to fly at some height higher than the optimum minimum head-disk separation value to accommodate the downward extension of regions 304 and/or 305. However, such higher fly heights can degrade the signal to noise ratio in the transducer element 303.

Figure 3:
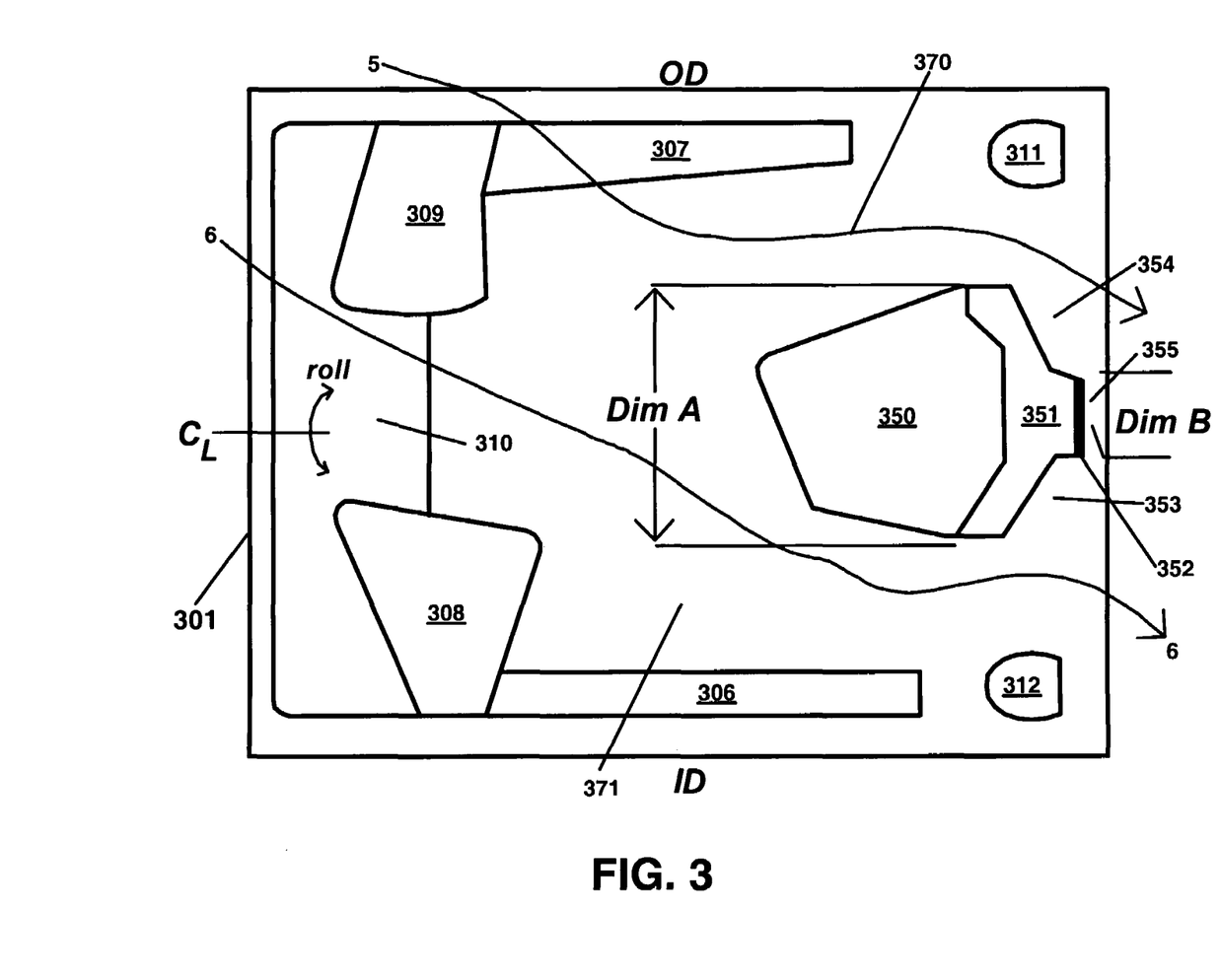
FIG. 3 depicts a head ABS, optimized to reduce fly height population standard deviation.

FIG. 3 depicts a head ABS slider 301, optimized to reduce fly height population standard deviation. Similar to the slider 301 described above with reference to FIG. 2, slider 301 has a center pad 350. Center pad 350 has a shape, contours, etc. of which are designed to optimize the fly height performance of the slider 301. For pad 350, Dimension B is significantly shorter than that of slider described above (FIG. 2). Thus, pad 350 has no material in regions 353 and 354. When the slider 301 attitude has a roll component in flight, none of its surfaces proximate thereto extend below the transducer 352. Hence, none of the slider's surfaces decrease its head-disk separation. Further, with all other relevant parameters equal, the ratio of Dimension A to Dimension B is significantly higher for ABS structure element 350 than for ABS structure element 302, described with reference to FIG. 2. This has the benefit of improving flying characteristics. For instance, between embodiments with all other relevant attributes alike, the take-off velocity is beneficially lower in that which has the higher dimension A/B ratio.

As the air stream lines 5 and 6 indicate, air flows associated with this shape of pad 350 converge in regions 353 and 354. In practice, the air flow can entrain particulate contamination. Particulate contamination entrained in the air stream can collect and congregate in regions 353 and 354 and can collide with and/or adhere to surfaces of ABS 350. In one embodiment, particulate contamination entrained in the air stream can collect and congregate on trailing edge 355. In one embodiment, particulate contamination entrained in the air stream can collect and congregate about transducer 352. Such contamination can be detrimental to the drive performance, e.g., in relation to transducer media sensing and aerodynamic performance of the head.

Figure 4:
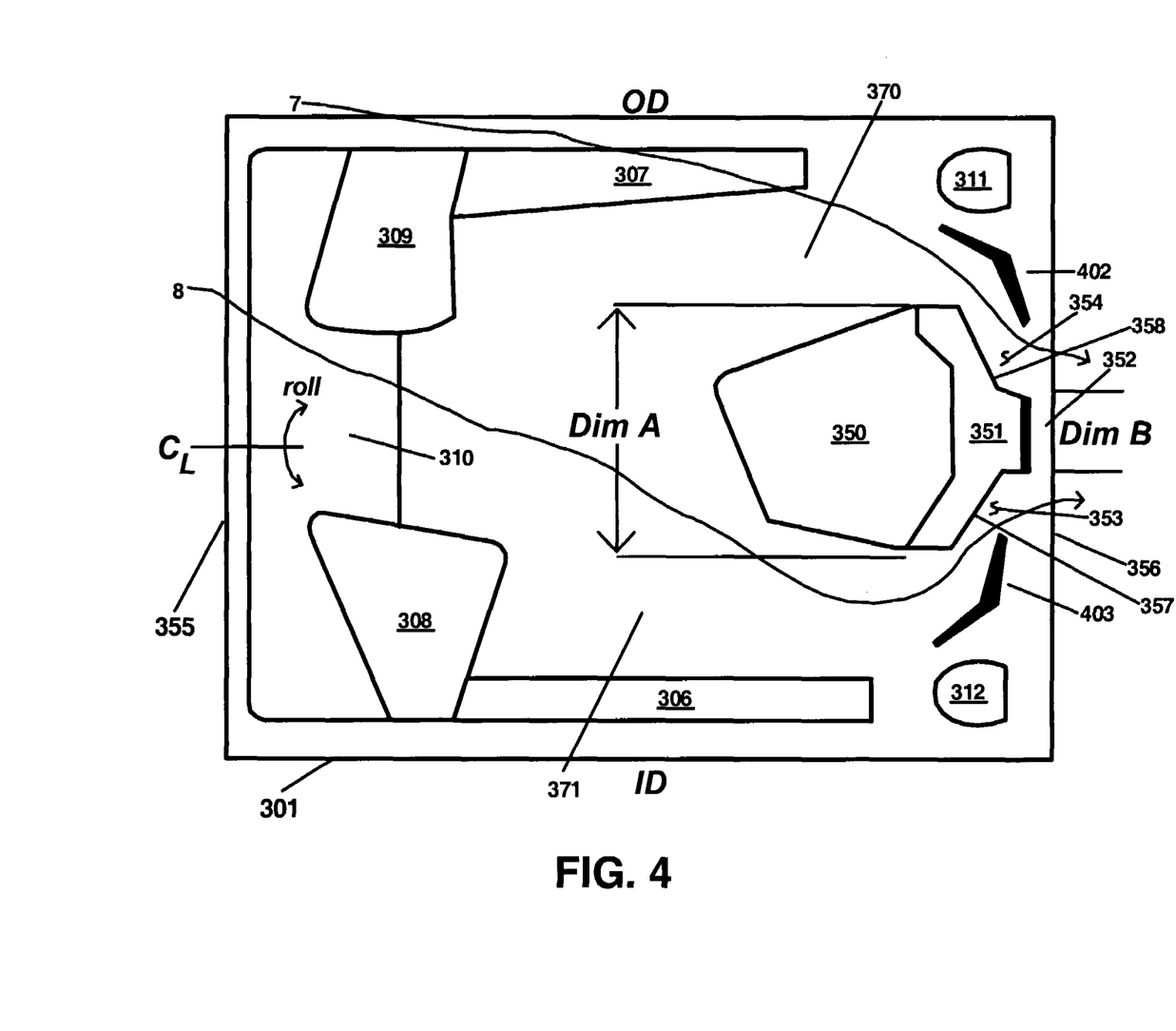
FIG. 4 depicts a disk drive head ABS, according to an embodiment of the present invention.

FIG. 4 depicts an exemplary air bearing slider 301, according to an embodiment of the present invention. Air bearing slider 301 has air dam 310, rails 306 and 307, pads 308, 309, 311, 312, and 350. In various embodiments, these air bearing components exemplified herein have any of various shapes, sizes, configurations, orientations, etc. and support and stabilize any type of sensing transducer for any of various media. The head slider 301 also has foils 402 and 403, which are positioned and shaped to direct the air flow towards the trailing edges 357 and/or 358 of pad 350 and trailing edge 356 of slider 301. The flow lines 7 and 8 depict that this air flow is directed to impinge on the trailing edges 357 and/or 358 of center pad 350, in the vicinity of regions 353 and 354. In the present embodiment, this impingement is sufficient to dislodge particulate contaminants that may be present on the trailing edges 357 and/or 358 and/or proximate with regions 353 and 354. Contaminants so dislodged can then be removed, effectively blown away by the air flow. Similarly, the air flow impinging on the trailing edge 356 effectively dislodges and removes particulate contaminate present proximate with the trailing edge 356 of slider 301. Further, this air flow deters the accumulation of particulate and/or other contamination in these regions or on the trailing edge.

Foils 402 and 403 herein exemplify any effective number, size, location, contour, shape, etc. of foils. In one embodiment, a single foil directs the air flow to impinge the training edge 357 or 358 of air bearing structure 350. In one embodiment, a single foil directs the air flow to impinge the trailing edge 356 of slider 301.

Figure 5:
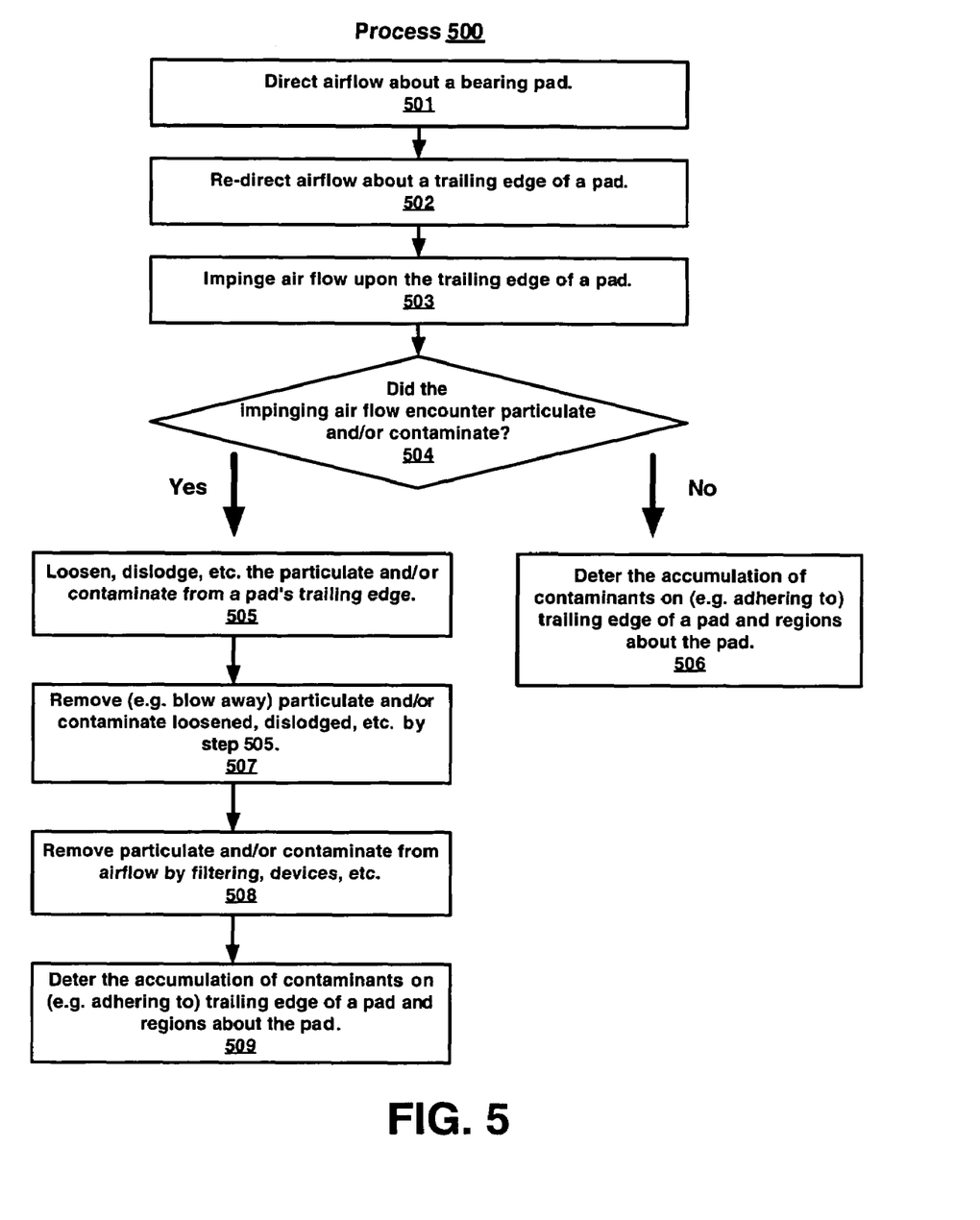
FIG. 5 is a flowchart of an exemplary process for removing a contaminant from an air bearing of a disk drive according to an embodiment of the present invention.

FIG. 5 is a flowchart of an exemplary process 500 for removing a contaminant from an air bearing of a disk drive using an embodiment of the present invention.

Process 500 begins with step 501, wherein an air flow is directed about a pad of the air bearing.

In step 502, the air flow is re-directed towards a trailing edge of the pad.

In step 503, the trailing edge of the air bearing pad is impinged with the re-directed air flow.

In step 504, the impinging air flow may or may not encounter particles and/or other contaminants on the trailing edge.

Where the impinging air flow does encounter such contamination, in step 505, that impinging air flow effectively loosens, dislodges, etc. the contaminants from the trailing edge of the pad.

Where the impinging air flow encounters no contaminants, in step 506, the impinging and re-directed air flows deter accumulation of contaminants on (e.g., adhering to, etc.) the trailing edge and the regions about the pad.

In step 507, the particles, other contaminants, etc. that are dislodged with the impinging air are removed (e.g., blown away) from the areas about the pad.

In step 508, the particles are removed from circulation with the air flow, such as with filtration media, devices, etc.

In step 509, further air flow deters contaminant accumulation on the slider trailing edge and/or the regions proximate thereto.

While flow chart 500 shows a specific sequence of steps characteristic of one embodiment, other embodiments of the present invention are well suited to function with more or fewer steps. Likewise, the sequences of steps in various such embodiments can vary from those exemplified with process 500, e.g., depending upon the application.

In summary, embodiments of the present invention provide, a method, apparatus, and assembly for removing particulate and other contaminants from the trailing edge of a hard disk drive air bearing and ABS regions proximate thereto. Embodiments of the present invention function with sufficient ABS air flow to achieve relatively low fly height variation; such as can occur with air flow disruptions due to particulate buildup and accumulation of other contaminants. In these embodiments, head-disc separation bridges due to such contaminant buildup, which can foul the region between the head and disk, is reduced. This reduction deters contaminant-caused transducer element signal degradation and possible head-disk encounter (e.g. contact) related damage.

Embodiments of the present invention, a method, apparatus, and assembly for removing particulate contamination from the trailing edge of an air bearing, is thus described. While the present invention has been described with reference to particular exemplary embodiments, the present invention should not be construed as limited by such embodiments, but rather construed according to the claims appended hereto and their equivalents.

What is claimed is:

1. A method for removing a contaminant from an air bearing of a hard disk drive head disk assembly, comprising:
   directing an air flow within said head disk assembly about a pad of said air bearing;
   re-directing said directed air flow towards a trailing edge of said pad; and
   impinging said trailing edge with said re-directed air flow, wherein said contaminant is dislodged from said trailing edge with said impinging air flow.

2. The method as recited in claim 1, further comprising deterring accumulation of one or more contaminants from a surface of said trailing edge.

3. The method as recited in claim 2 wherein said deterring is achieved with one or more of said directing, said re-directing, and said impinging.

4. The method as recited in claim 1, further comprising removing said contaminant from one or more of said air flow, said re-directed air flow and said impinging air flow.

5. The method as recited in claim 1 wherein said directing is achieved with one or more channels arranged about said pad.

6. The method as recited in claim 1 wherein said re-directing is achieved with one or more foil structures disposed within each of said channels.

7. The method as recited in claim 6 wherein said foil structures are proximate with said trailing edge.

8. An apparatus for removing a contaminant from an air bearing of a hard disk drive head disk assembly, comprising:
   one or more channels, for directing an air flow within said head disk assembly about a pad of said air bearing; and
   one or more foil structures arranged within each of said channels, for re-directing said directed air flow towards a trailing edge of said pad wherein said re-directed air flow impinges a surface of said trailing edge and wherein said impinging air flow impinging said trailing edge with said re-directed air flow, wherein said contaminant is dislodged from said trailing edge with said impinging air flow.

9. The apparatus as recited in claim 8 wherein one or more of said directed air flow, said re-directed air flow, and said impinging air flow deter accumulation of one or more contaminants from said surface of said trailing edge.

10. The apparatus as recited in claim 8, further comprising a device for removing said dislodged contaminant from one or more of said air flow, said re-directed air flow and said impinging air flow.

11. The apparatus as recited in claim 8 wherein said foil structures are proximate with said trailing edge.

12. The apparatus as recited in claim 8 wherein said foil structures are formed by a process comprising ion milling.

13. The apparatus as recited in claim 12 wherein said ion milling process is performed on an area proximate with said trailing edge.

14. The apparatus as recited in claim 8 wherein said pad comprises:
   said trailing edge;
   a leading edge opposite from said trailing edge; and
   a transducer disposed upon said pad, for transducing a signal corresponding to a movable medium proximate with which said pad is disposed.

15. A head disk assembly for a hard disk drive, comprising:
   a movable medium for storing information;
   a head proximate to said medium and moveable relative thereto, said head for selectively reading and writing said info respectively to and from said medium; and
   an air bearing surface disposed upon said head, wherein said air bearing surface comprises:
   a pad having a leading edge and a trailing edge;
   one or more channels for directing air flow within said head disk assembly about said pad; and
   one or more foil structures arranged within each of said channels, for re-directing said directed air flow towards said trailing edge, wherein said re-directed airflow impinges a surface of said trailing edge and wherein said impinging air flow removes a contaminant therefrom.

16. The head disk assembly as recited in claim 15 wherein said impinging air flow further deters accumulation of a contaminate about said trailing edge.

17. The head disk assembly as recited in claim 15 wherein said foil structures are formed with ion milling.

18. The head disk assembly as recited in claim 17 wherein said ion milling is performed proximate to said trailing edge.

19. The head disk assembly as recited in claim 15, wherein said pad comprises:
- a transducer disposed upon said pad, for transducing a signal corresponding to a movable medium proximate with which said pad is disposed; and
- one or more foil structures arranged within each of said channels, for re-directing said directed air flow towards said transducer, wherein said re-directed airflow impinges about said transducer and wherein said impinging air flow removes a contaminant therefrom.

20. The head disk assembly as recited in claim 15, wherein said head comprises:
- a trailing edge; and
- one or more foil structures arranged within each of said channels, for re-directing said directed air flow towards said trailing edge, wherein said re-directed air flow impinges about said trailing edge and wherein said impinging air flow removes a contaminant therefrom.

* * * * *